M. Irion,
Button-Hole Cutter.
N° 25,303.          Patented Aug. 30, 1859.
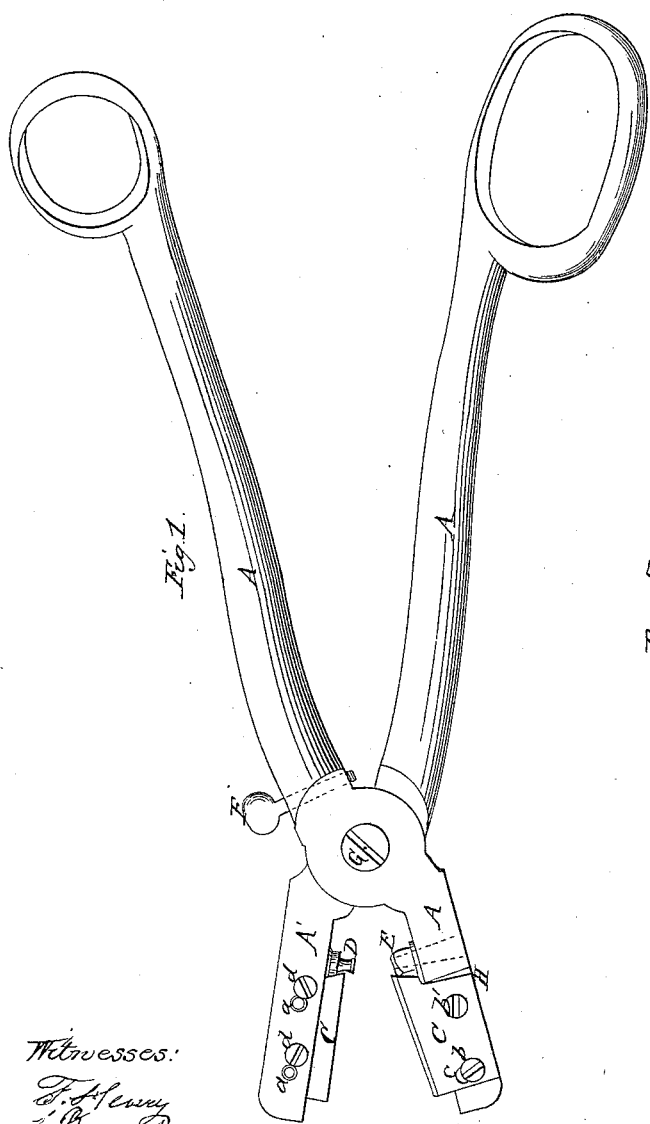
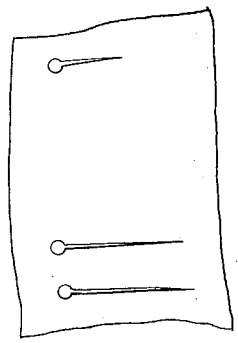
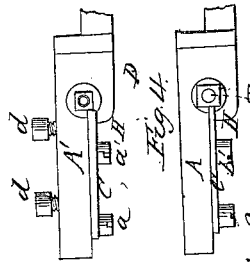
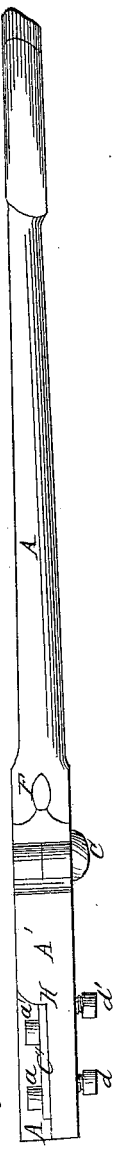
Witnesses:
Inventor:

UNITED STATES PATENT OFFICE.

MICHAEL IRION, OF UTICA, NEW YORK, ASSIGNOR TO HIMSELF AND JACOB HEIDEL, OF ONEIDA COUNTY, NEW YORK.

SHEARS.

Specification of Letters Patent No. 25,303, dated August 30, 1859.

*To all whom it may concern:*

Be it known that I, MICHAEL IRION, of Utica, in the county of Oneida and State of New York, have invented a certain Improvement in Shears for Cutting Buttonholes, the construction and operation of which I have described in the following specification and illustrated in its accompanying drawings with sufficient clearness to enable competent and skilful workmen in the arts to which it pertains or is most nearly allied to make and use my invention.

My said invention consists in the combination and arrangement of parts hereinafter more particularly described, consisting of a punch and hollow cylinder, and a pair of cutting edges, attached to two handles or levers at or near their extremities, the said handles or levers being fixed together so as to operate like a pair of common shears; by means of which combination I am enabled, with one motion of the said levers to cut, in the cloth or other materials to be operated upon, a straight slit terminated by a circular aperture, to serve as a button hole, as hereinafter more fully set forth.

In the accompanying drawings—Figure 1 is a plan of my improved button hole cutter. Fig. 2 is a side elevation of it. Fig. 3 is an elevation of the inner surface of that part which contains the punch. Fig. 4 is an elevation of the inner surface of the opposite and corresponding part which contains the hollow cylinder. Fig. 5 is a representation of a piece of cloth or other material showing the form of the holes made by the cutter.

A, A', are the arms or levers united by the joint G, and opening and closing in the same manner as a pair of common shears. The portions of the sides of these arms which are below the joint G, that is the parts which in common shears would form the cutting blades are formed with a sinking or rabbet in each, but on the opposite surfaces of the blades, as shown at H, H, on the drawings. Upon the depressed surfaces made by these sinkings I fix, by means of the screws $a$, $a'$, and $b$, $b'$, the two cutting plates C, C', firmly in position, the screws passing quite through the blades for that purpose, as shown on the blade A' at $a$, $a'$, Fig. 1. Should these cutting plates when fixed not slip upon each other smoothly when the blades are in the act of being closed, I loosen to a sufficient extent the screws $a$, $a'$, in the blade A', and at the same time tighten the two remaining screws $d$, $d'$, on the opposite side of the same blade; by this operation I remove the cutting plate C' a sufficient distance from its former position to allow it to pass freely over the opposite plate C, while the action of the screws $a$, $a'$, and $d$, $d'$, upon its opposite surfaces keeps it securely in its new position. Again, should the cutting plates pass or slide upon each other smoothly, but at the same time not meet at their points when the handles or levers are brought into contact;—in that case I slightly loosen the screws $b$, $b'$, turn the point of the plate C (without removing it) a sufficient distance inward around the screw $b'$ as an axis, which the slot $c$ permits me to do, and again secure it by tightening the screws $b$, $b'$.

The foregoing portions of my apparatus of which I have now finished the description, will it is evident operate so as to cut a straight slit in cloth or other material, commencing at a distance from the edge of the cloth equal to the distance from the inner end of either cutting plate to the hub, provided the edge of the cloth be brought in contact with the hub before the closing of the cutting plates commences; the slit may however be brought as near the edge of the cloth as may be desired by merely changing the position of its edge with respect to the inner end of the cutting plates as will be evident from the description.

I now proceed to show the further appliances by means of which I am enabled to perforate the cloth or other material with a circular hole, as before alluded to in the declaration. To effect this object, I insert the solid cylindrical punch D into the arm A', close to the inner end of the cutting plate C', and so positioned with respect to the said plate, that a continuation of the plane of the inner surface of the latter would pass through the axis of the cylinder; I also form this cylinder in such a manner that it springs from a square base, and is raised a short distance above the cutting edge of the plate C', as shown in Fig. 1, while at the same time the diameter of the cylindrical part where it comes in contact with the cutting plate being less than the diameter at the top, allows the top of the cylinder or punch to overhang the cutting plate. The square base from which this cylinder springs is securely fixed in the arm A' by any of the methods well known to machinists. Directly opposite to this punch, in the other arm A, I insert the square piece E, which is perforated with a conical aperture in the direction of its length so as to form a die, while the sides for a short distance from the top or inner end are rounded away to a spherical form so as to present a circular cutting edge to the punch, thereby enabling me to cut a clean circular aperture in the cloth or other material, while at the same time the projection of the punch D above the cutting edge of the plate allows this circular aperture to be made before the junction of the cutting edges commences for the purpose of making the straight slit; and the additional circumstance of the end of the punch D overhanging the cutting plate C′, has the effect of causing the first junction of the cutting plates to take place within the circular aperture, thereby making the slit and aperture continuous so as to leave no ragged edges between them.

The regulating or set screw F, works in a threaded perforation provided for that purpose in the arm A, and by operating this screw so that its end or point will protrude beyond the inner surface of the said arm, I can thereby prevent the cutting plates from being closed upon each other for the whole of their length, and by that means shorten the length of the button hole so as to accommodate it to the size of the button.

The particular improvement which constitutes my said invention, and which I claim as having been originally and first invented by me is—

The combination of the cutting plates C, C′, the circular punch D, and the circular die E to receive the punch, and surrounded by a cutting edge as described, in connection with a pair of movable jointed arms, the whole so combined and arranged to operate in the manner as hereinbefore more fully set forth.

MICHAEL IRION.

Witnesses:
F. HENRY,
S. PRINGSICK.